United States Patent [19]

Ozawa

[11] Patent Number: 5,904,173
[45] Date of Patent: May 18, 1999

[54] DOUBLE SEALED VALVE

[75] Inventor: Kaoru Ozawa, Tsuyama, Japan

[73] Assignee: Toyo Stainless Steel Industries, Co., Ltd., Japan

[21] Appl. No.: 08/890,953

[22] Filed: Jul. 10, 1997

[30] Foreign Application Priority Data

| Jul. 15, 1996 | [JP] | Japan | 8-184886 |
| Jul. 15, 1996 | [JP] | Japan | 8-184887 |
| Jul. 15, 1996 | [JP] | Japan | 8-184888 |
| Jul. 15, 1996 | [JP] | Japan | 8-184889 |
| Jul. 15, 1996 | [JP] | Japan | 8-184890 |

[51] Int. Cl.$^6$ .............................. B08B 9/02; F16K 1/44; F16K 51/00
[52] U.S. Cl. .................... 137/240; 137/312; 137/614.18; 251/63.5; 251/63.6
[58] Field of Search .................................. 137/240, 312, 137/614.17, 614.18, 614.19; 251/63.5, 63.6

[56] References Cited

U.S. PATENT DOCUMENTS

| 4,304,251 | 12/1981 | Schadel et al. | 137/312 |
| 4,360,039 | 11/1982 | Jeppsson | 137/614.17 |
| 4,373,545 | 2/1983 | Knappe | 137/312 |
| 4,552,167 | 11/1985 | Brakelmann | 137/614.18 |
| 4,605,035 | 8/1986 | Rasmussen et al. | 137/614.18 |
| 4,617,955 | 10/1986 | Melgaard | 137/614.17 |
| 4,655,253 | 4/1987 | Ourensma | 137/312 |
| 4,757,834 | 7/1988 | Mieth | 137/312 |
| 5,575,305 | 11/1996 | Mieth | 137/15 |
| 5,645,102 | 7/1997 | Brackelmann et al. | 137/312 |

Primary Examiner—George L. Walton
Attorney, Agent, or Firm—Schweitzer Cornman Gross & Bondell LLP

[57] ABSTRACT

A double sealed valve according to the invention includes a valve seat 6 in a communicating passage 3 formed between an upper passage 1 and a lower passage 2. The valve also includes a first vertical valve stem 8 and a second vertical valve stem 10, which is hollow and slidably surround the first stem 8. The first stem 8 has a first valve plug 7 for slidable engagement with an inner peripheral side of the seat 6. The second stem 10 has a second valve plug 9 for compressive engagement with an upper side of the seat 6. The first stem 8 is connected to a valve drive mechanism 28. When the valve opens, the drive 28 lifts the first stem 8, which the second plug 9 moves upward.

7 Claims, 11 Drawing Sheets

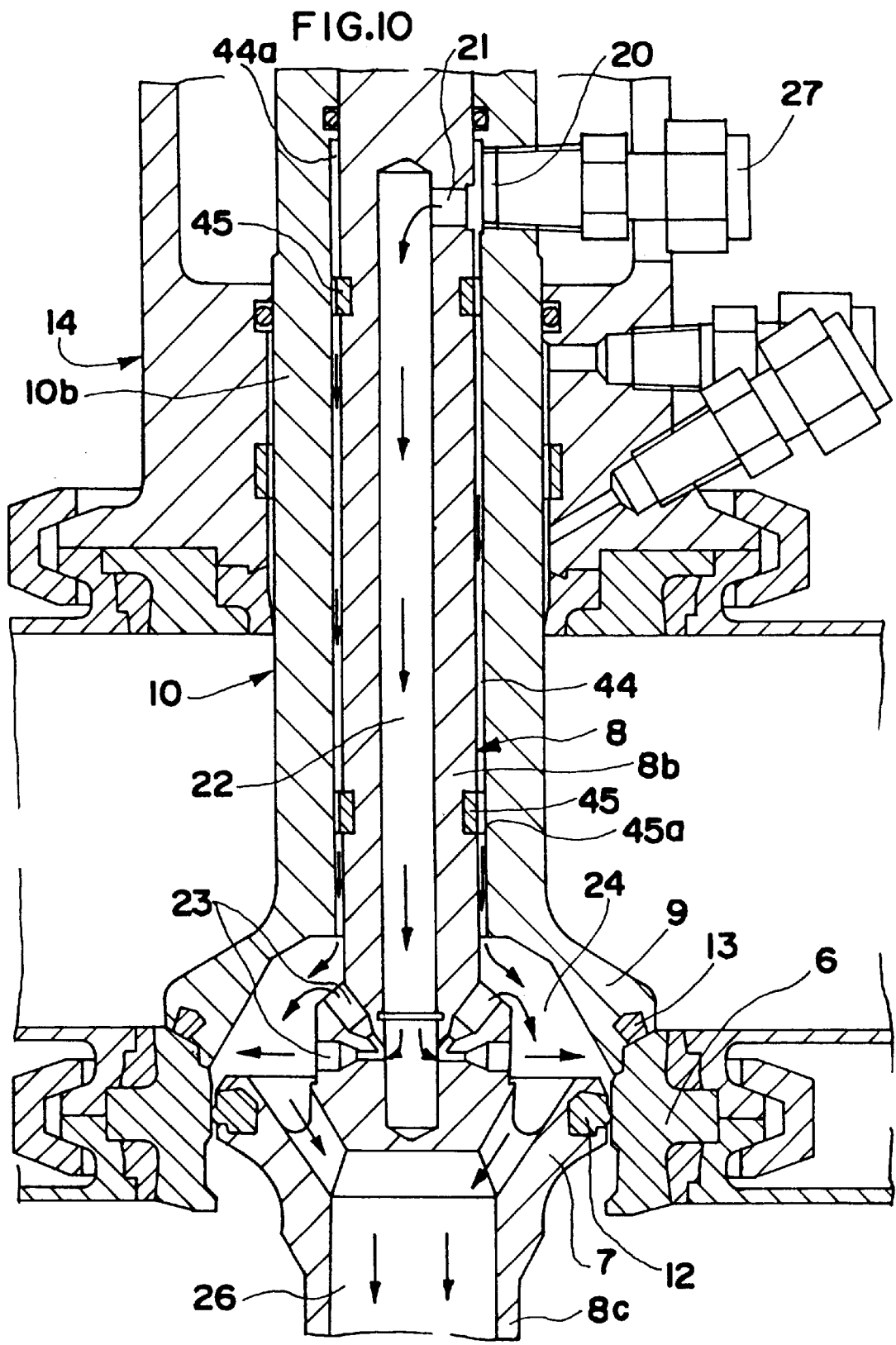

DOUBLE SEALED VALVE

FILED OF THE INVENTION

The present invention relates to a double sealed valve for use with liquid flow lines in a machine or a plant for food production, brewing, distilling, or the like. In particular, the invention relates to valve structure with liquid passages doubly sealed to prevent the liquids flowing through the passages, respectively, from mixing with each other.

BACKGROUND OF THE INVENTION

A conventional double sealed valves generally type include a valve seat in a communicating passage, which is formed between an upper passage and a lower passage. The valve also includes a first vertical valve stem and a second vertical valve stem. The first stem has a first valve plug for vertically slidable engagement with an inner peripheral surface of the seat through a primary annular packing member, which is fitted to the first plug. The second stem has a second valve plug for compressive engagement with an upper surface of the seat through a secondary annular packing member, which is fitted to the second plug. The plugs can be opened and closed by properly driving the stems with a valve drive mechanism. Each of the packing members is made of rubber, and held in the annular groove formed in the surface of the associated packing member which faces the seat.

The downward movement of the second valve plug brings the secondary annular packing member into compressive engagement with the upper surface of the valve seat. Therefore, when the second plug closes, only a compressive force acts on the secondary packing member, and no shear force acts. On the other hand, the vertical movement of the first valve plug brings the primary annular packing member into axially slidable engagement with the inner surface of the seat, which may be made of stainless steel. Since a large frictional resistance acts on the sliding surfaces, a shear force is produced at the boundary between the outer or exposed part of the primary packing member which protrudes from the associated groove and the remaining inner part in the groove. If the shear force is excessive, the packing member may be damaged.

When the valve is closed, the annular packing members are restrained and compressed by valve seat surfaces. When the valve opens, the packing members are freed from restraint, so that their outer parts swell or dilate. The dilatation of the outer parts may increase remarkably with the pressure fluctuation and/or temperature change of the liquid flowing through the valve when the valve is open. If the outer part of the primary packing member has greatly swelled when the first valve plug transfers or shifts from its open state to its closing action, the forced engagement of the outer part with the inner surface of the seat applies an excessive shear force to the outer part. The outer part may consequently be damaged in a short time.

The ratio of the volume of the outer part to that of the inner part is relational to the dilatation of the outer part due to the presence fluctuation and/or temperature change of the liquid flowing through the valve. The larger in volume the inner part is as compared with the outer part, the smaller the dilatation of the outer part is. In addition, if the outer part of the primary annular packing member is partially restrained when the first valve plug is open, the outer part can be restrained from swelling when the plug opens.

SUMMARY OF THE INVENTION

In view of the above, it is a primary object of the present invention to provide a double sealed valve, which includes a valve plug holding an annular packing member for slidable engagement with the valve seat, the packing member for slidable engagement with the valve seat, the packing member being improved in durability by reducing as much as possible the shear force acting on the exposed part of the packing member when the plug shifts from its open position to its closing action.

It is another object of the invention to provide a double sealed valve which can be used safely without malfunctioning, and to make compact the drive mechanism for driving the valve.

It is still another object to provide a double sealed valve, which includes a first valve stem and a second valve stem slidable axially around the first stem the second stem having a port through which to supply a washing liquid for easily washing the clearance between the stems.

It is yet another object to provide a double sealed valve, which includes a valve stem for slidable engagement with the valve seat, the clearance between the stem and seat being kept substantially constant by absorbing a slight error, if any, in the stem stroke.

It is a further object to provide a double sealed valve, which includes one or more valve stem parts exposed to the air, the parts being able to be washed immediately, when necessary.

BRIEF DESCRIPTION OF THE INVENTION

The invention is described in greater detail with reference to the accompanying drawing in which:

FIG. 10 is an enlarged partial view in axial cross section of the valve, showing the annular passage for washing liquid defined between the first and second valve stems;

DETAILED DESCTIPTION

Figure 1:
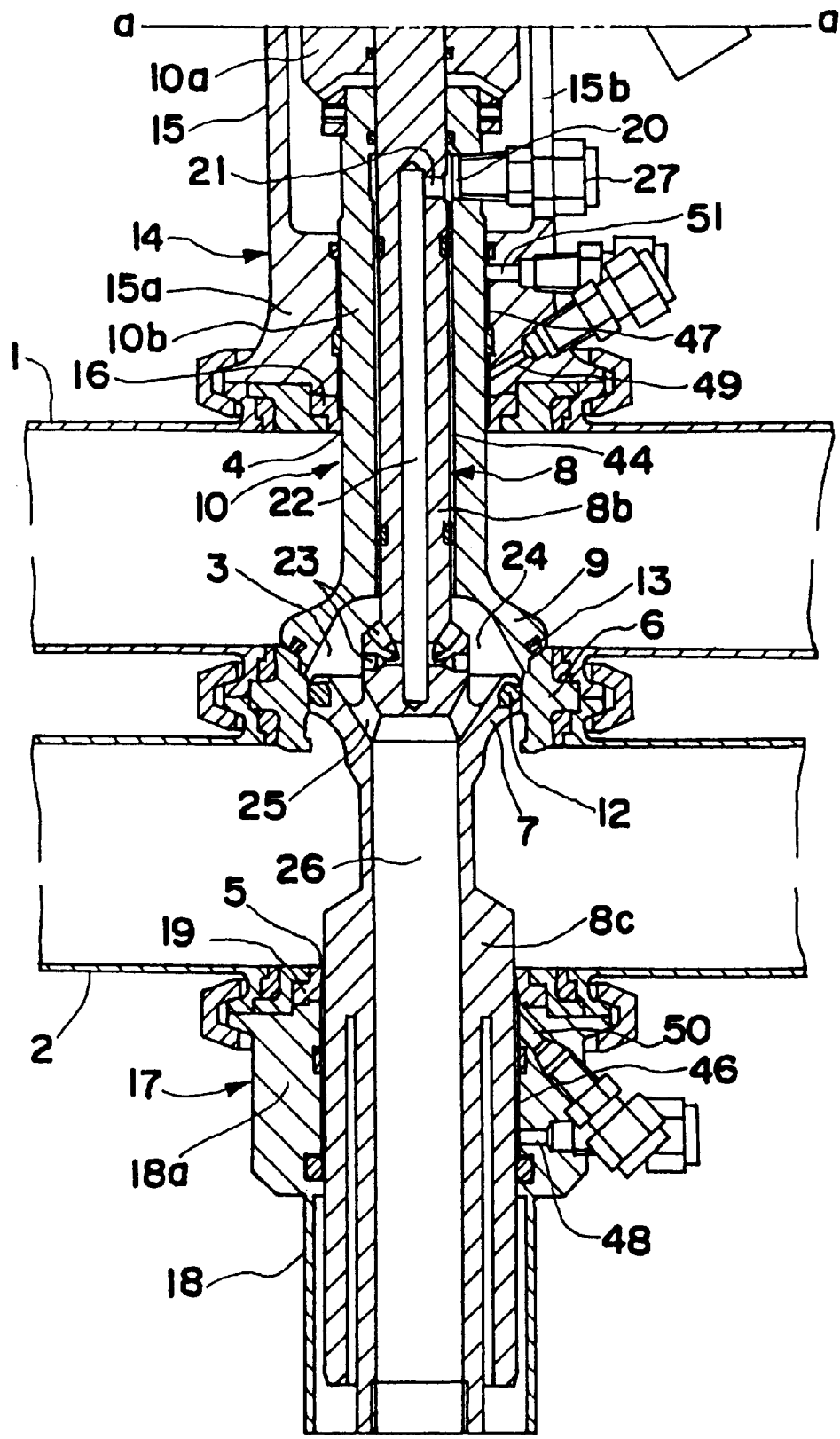
FIG. 1 is an axial cross-sectional view of the lower half below the line a—a, of a double sealed valve according to the invention.
Figure 2:
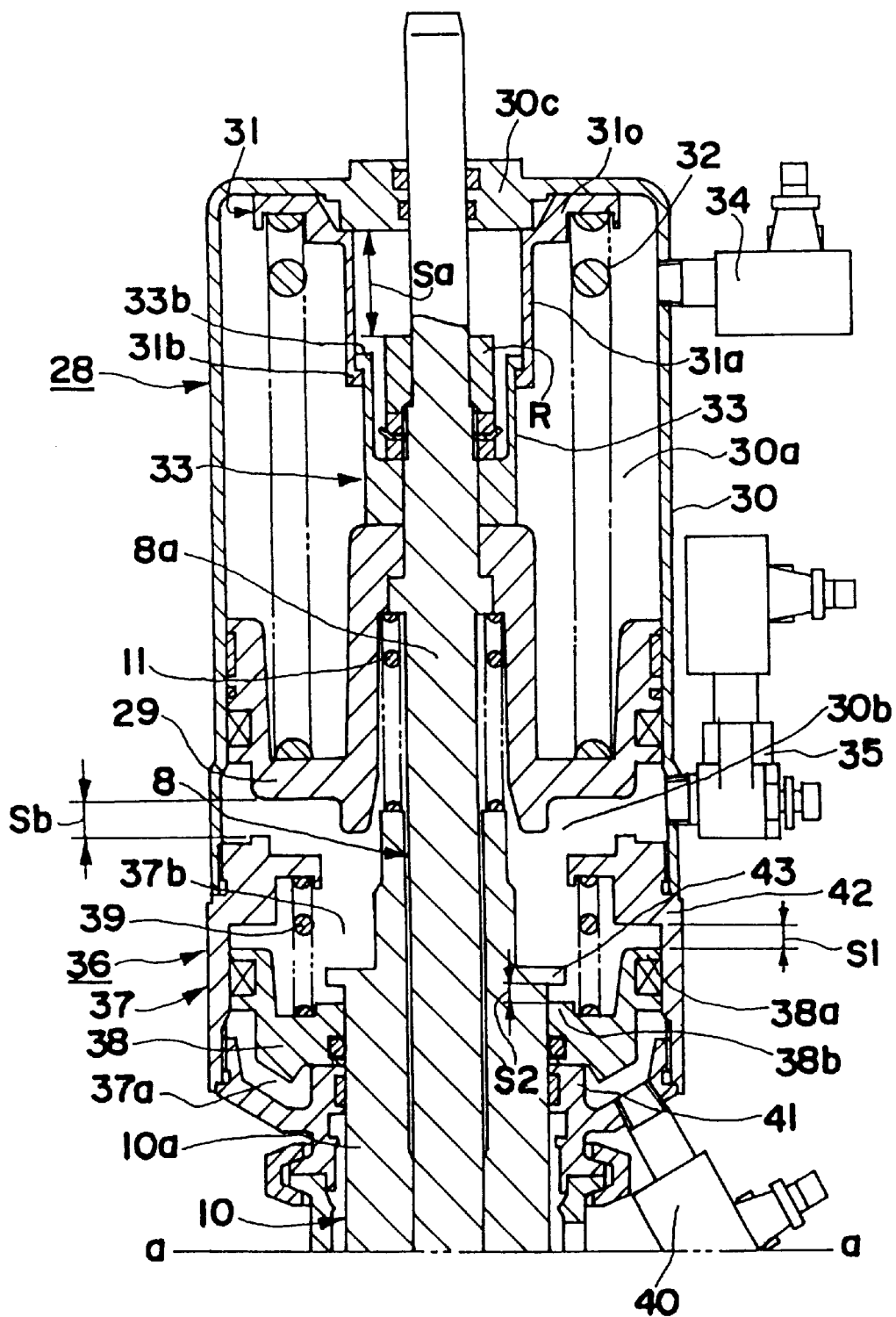
FIG. 2 is an axial cross-sectional view of the upper half above the line a—a of the valve.

In the illustrated embodiment of the double sealed of the valve present invention, in FIGS. 1 and 2, has a circular cross-section and is shown with a vertical axial. An upper passage 1 and a lower passage 2 extend horizontally either in parallel or across each other. The passages 1 and 2 are interconnected by a communicating passage 3, which is defined by a valve seat 6. The upper passage 1 has a top opening 4 formed through its wall. The lower passage 2 has a bottom opening 5 formed through its wall. The communicating passage 3 and the openings 4 and 5 are circular in cross-section and coaxial with the vertical axis. Suitably a beverage or drinking water and a washing liquid respectively flow through the passages 1 and 2.

A first valve stem 8 having a circular cross-section is disposed coaxially with the vertical axis. The stem 8 extends through the openings 4 and 5 and the communicating passage 3. The stem 8 integrally includes a cylindrical middle stem part 8b, which extends through the top opening 4, and a cylindrical lower stem part 8c, which extends through the bottom opening 5. Formed between the stem parts 8b and 8c is a first valve plug 7, which is integral and coaxial with them. The plug 7 can engage with the inner periphery of the valve seat 6. The stem 8 also includes an upper solid stem part 8a suitably in coaxial threaded engagement with the top of the middle stem part 8b (however, in FIGS. 1 and 2, the stem parts 8a and 8b are shown as formed integrally with each other).

A cylindrical second valve stem 10 coaxially surrounds part of the upper valve stem part 8a of the first valve stem 8 and the middle stem part 8b. This stem 10 includes an upper valve stem part 10a and a lower valve stem part 10b in coaxial threaded engagement with each other. As shown in greater detail in FIGS. 3–7, the lower valve stem part 10b has a second valve plug 9 formed integrally at its bottom. The stem 10 is urged downward by a first coil spring 11, so that the second valve plug 9 compressively engages an upper surface of the valve seat 6 and its positioned over a first valve plug 7. The first and second valve plugs 9 and 7, the seat 6 and the bottom of the middle stem part 8b define an annular space 24.

As is readily apparent from all figures, the first valve plug 7 has an annular groove 7a formed in its outer periphery. The groove 7a holds a primary annular gasket 12 for tight but slidable contact with an inner peripheral surface 6a of the valve seat 6. The second valve plug 9 has an annular groove 9a formed in its bottom. The groove 9a holds a secondary annular gasket 13 for compressive contact with the upper conical surface 6b of the seat 6. An annular member is located at the top opening 4 of the upper passage 1. The lower stem part 10b of the second valve stem 10 is guided slidably through the member 14. The annular member 14 includes the loose portion 15a of a yoke 15. The base portion 15a has a gasket 16 on its bottom for a liquid tight but slidable engagement with the lower stem part 10b. An annular member 17 is located at the bottom opening 5 of the lower passage 2 is through which the lower stem part 8c of the first valve stem 8 is slidably guided. The annular member 17 includes the thick base 18a of a sleeve 18. The base 18a has a gasket 19 on its top for liquid tight but slidable engagement with the lower stem part 8c.

As best shown in FIG. 10, the middle stem part 8b of the first valve stem 8 has an axial bore 22 formed in it. The middle stem part 8b also has an upper communicating hole 21 and a number of lower orifices 23. The hole 21 and orifices 23 are formed through the cylindrical wall of the middle stem part 8b and communicate with the bore 22. Some of the orifices 23 extend radially and the others extend at an angle with them. The lower valve stem part 10b of the second valve stem 10 has a supply port 20 formed through its cylindrical wall, which communicates with the upper communicating hole 21 of the first valve stem 8 when the second valve plug 9 engages with the valve seat 6. A nozzle 27 is fitted to the supply port 20 for the connection with a hose (not shown) for supplying a washing liquid. The nozzle 27 extends through a window 15b in the yoke 15. The washing liquid is supplied through the hose to the nozzle 27 and to the port 20. Part of the liquid is introduced through the upper communicating hole 21 into the axial bore 22 and is discharged into the lower parts of their valve through the orifices 23.

Figure 8:
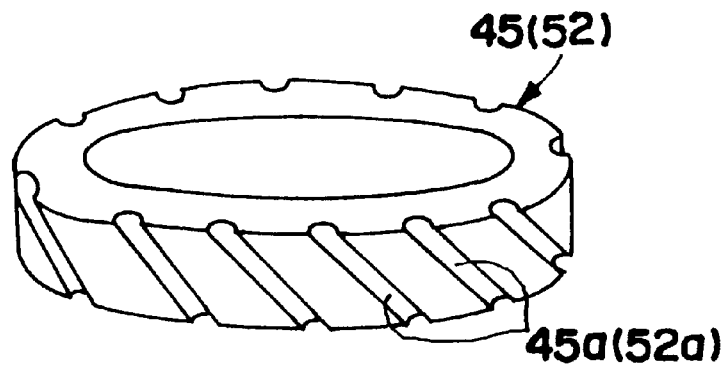
FIG. 8 is an enlarged perspective view of a ring in the valve for forming a spiraling liquid flow pattern.

An annular passage 44 is defined between the outer periphery of the middle stem part 8b of the first valve stem 8 and the inner periphery of the lower stem part 10b of the second valve stem 10. A part of the washing liquid supplied through the port 20 is introduced into the annular passage 44 and is discharged at the bottom along the middle stem part 8b. The annular passage 44 includes a top or introductory part 44a, which has a little larger diameter to introduce the liquid from the port 20 effectively into the communicating hole 21 and the passage 44. Two or more rings 45 of fluororesin are at middle stem part 8b applied to the outer periphery of the upper and lower positions in the annular passage 44. As shown in FIG. 8, each ring 45 has spiral grooves 45a formed at circumferentially regular intervals in its outer periphery to forward the liquid introduced into the passage 44 as a spiral or helical flow.

Thus, suitably about 70% of the washing liquid supplied through the supply port 20 flows through the upper communicating hole 21 flows into the axial bore 22, while about 30% flows through the annular passage introductory part 44a into the annular passage 44 itself. The liquid in the bore 22 is ejected through the bottom orifices 23 into the annular space 24. The ejected liquid washes the inside of the space 24, which includes the inner periphery of the valve seat 6 and the inner surfaces of the valve plugs 7 and 9. Then, the liquid is discharged through drain holes 25 formed in the first valve stem 8 and then through the bore 26 in the lower stem part 8c to the exterior. The liquid in the annular passage 44 flows through the spiral grooves 45a of the rings 45, where it is formed into (a) spiral flow. The spiral flow completely washes the inside of the annular passage 44 and is discharged through the annular space 24, the holes 25 and the bore 26 to the exterior.

Thus, by supplying a washing liquid through the supply port 20, it is possible to wash the inner periphery of the valve seat 6 and the inner surfaces of the valve plugs 7 and 9. It is possible automatically and completely to wash at the same time through the annular passage 44 the clearance for sliding between the outer periphery of the middle stem part 8b of the first valve stem 8 and the inner periphery of the lower stem part 10*b* of the second valve stem 10. The washing liquid formed into a spiral flow through by the rings 45 will more effectively wash the interior of the annular passage 44.

Figure 11:
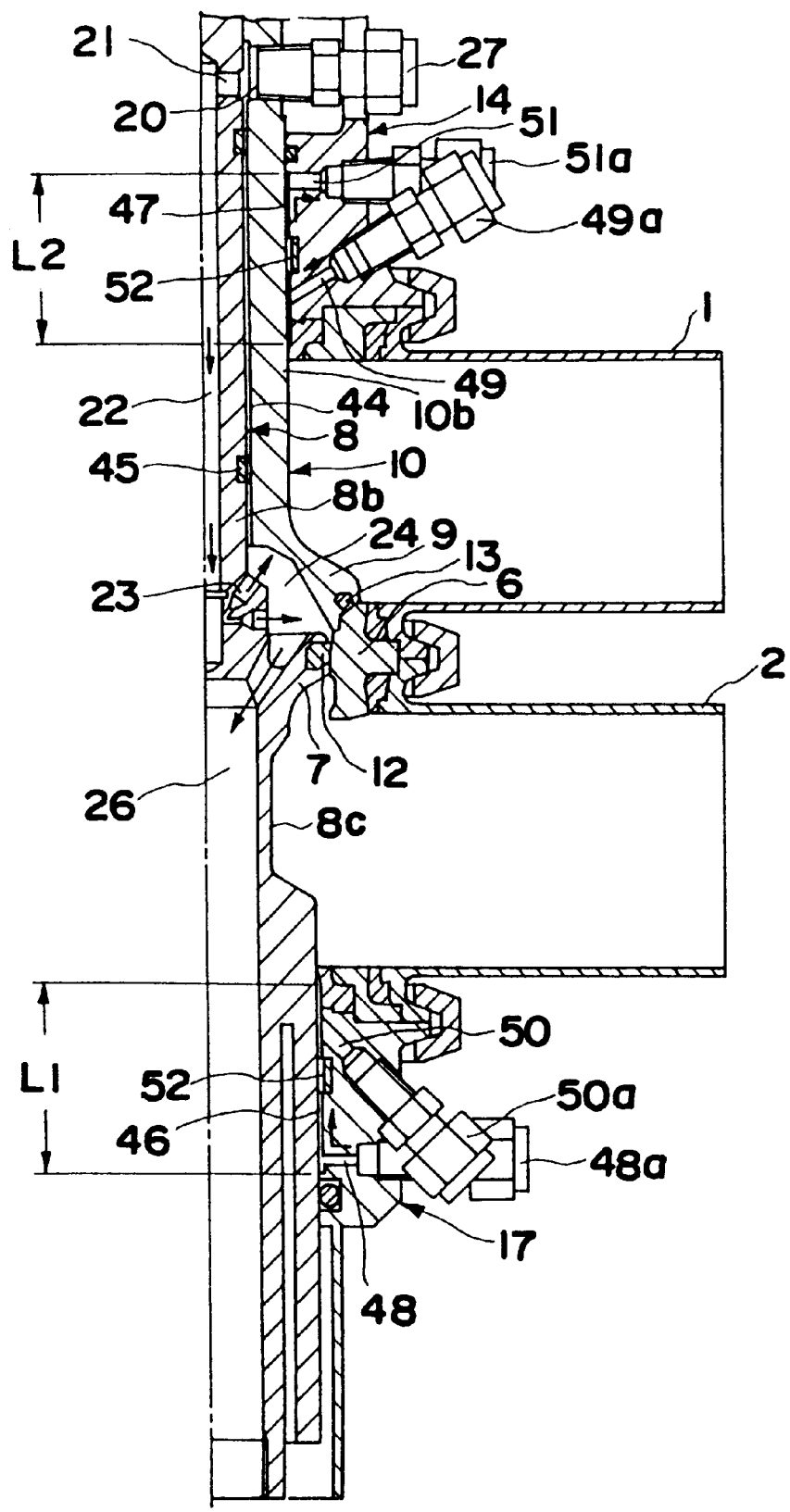
FIG. 11 is a partial view in axial cross section of the valve, showing the annular passages for washing liquid each defined between the outer periphery of one of the valve stems and the inner periphery of the associated annular member.

With reference to FIGS. 1 and 11, an annular passage 46 is defined between the outer periphery of the lower stem part 8*c* of the first valve stem 8 which extends downward from the lower passage 2 and the inner periphery of the annular member 17, which guides this stem part. Another annular passage 47 is defined between the outer periphery of the lower valve stem part 10*b* of the second valve stem 10 which extends upward from the upper passage 1 and the inner periphery of the annular member 14, which slidably guides this stem part. The respective lengths of the passages 46 and 47 L1 and L2 are longer than the maximum strokes of each of the stems 8 and 10. The passages 46 and 47 have supply ports 48 and 49 formed at their respective bottoms, and discharge ports 50 and 51 formed at their respective tops. The supply ports 48 and 49 are smaller in diameter than the discharge ports 50 and 51. Nozzles 48*a* and 49*a* are respectively provided for the supply ports 48 and 49 for connection to hoses (not shown) for supplying a washing liquid. Nozzles 50*a* and 51*a* are respectively provided for the discharge ports 50 and 51 for connection to hoses (not shown) for discharging the liquid.

Figure 5:
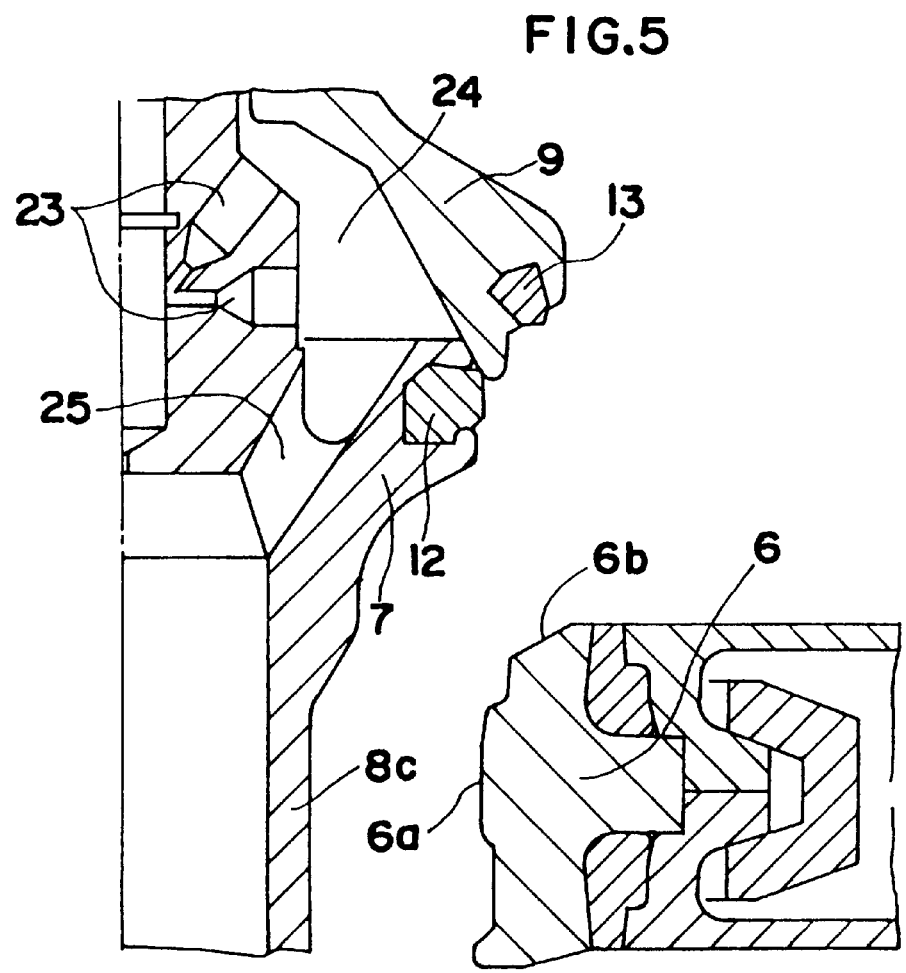
FIG. 5 is an enlarged fragmentary view in axial cross section of the valve when it is fully opened.
Figure 6:
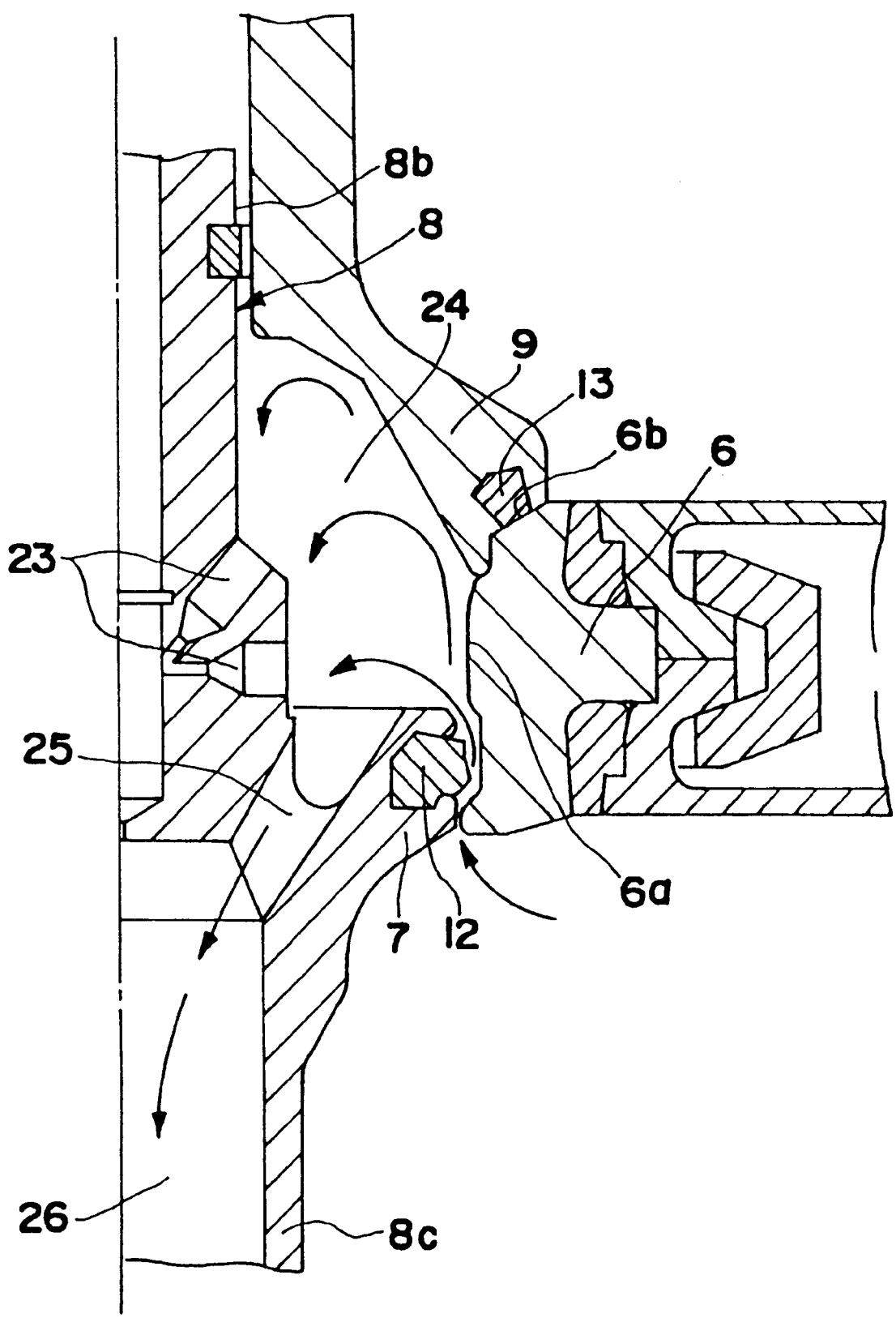
FIG. 6 is an enlarged fragmentary view in axial cross section of the valve partially opened with the first valve plug slightly open and the second valve plug closed.

FIGS. 1, 3, 10 and 11 show the first stem 8 in a lower position, where the first valve plug 7 is closed. FIG. 5 shows relative to the valve seat 6, both stems 8 and 10 in their upmost positions at which both plugs 7 and 9 are open, and where a top portion of the lower stem part 10*b* extends above the annular member 14 and is exposed to the open. FIG. 6 shows relative to the valve seat 6 both stems 8 and 10 in their lower most positions, where the first plug 7 is open and the second plug 9 is closed, and where a bottom portion of the lower stem part 8*c* protrudes below the annular member 17 and is exposed to the open. When the first stem 8 moves from its lowermost position to its topmost position, its exposed bottom portion does not enter the lower passage 2. When the second stem 10 moves from its uppermost position to its lowermost position, its exposed top portion does not enter the upper passage 1. Thus, since through the entire strokes of the stems 8 and 10 they remain covered by the annular passages 46 and 47 inside the respective annular members 17 and 14, and since the annular passages 46 and 47 are longer than the maximum strokes of the respective valve stems 8 and 10, it is possible securely to prevent the exposed portions of the stems 8 and 10 from entering the respective passages 2 and 1. In addition, the portions of the stems 8 and 10 which have been exposed to the open in any valve position or state, can be immediately washed by supplying the annular passages 46 and 47 with a washing liquid through the respective ports 48 and 49. It is therefore possible promptly and adequately to cope with any pollution of the parts.

As best shown in FIG. 11, the annular members 14 and 17 are each provided with a fluoropolymer ring 52 positioned in the respective associated annular passage 46, 47. As shown in FIG. 8, the ring 52 has spiral grooves 52*a* formed at circumferentially regular intervals in its outer periphery to form a spiral flow of the washing liquid that is introduced into the passages 46, 47.

As best shown in FIG. 11 a pressurized washing liquid is supplied through the supply port 48 to wash the lower stem part 8*c* of the first valve stem 8 which extends downward from the lower passage 2. The liquid sufficiently washes the outer periphery of the stem part 8*c* while flowing through the annular passage 46. Then, the liquid is discharged through the discharge port 50. The liquid flowing through the passage 46 is formed into a spiral flow through the spiral grooves 52*a* of the lower ring 52. The spiral flow can effectively wash the outer periphery of the stem part 8*c*. Likewise, a pressurized washing liquid is supplied through the port 49 to wash the second valve stem 10. The liquid sufficiently washes the outer periphery of the lower stem part 10*b* while flowing through the annular passage 47, and is discharged through the discharge port 51. The liquid is formed into a spiral flow by the upper ring 52. The spiral flow can effectively wash the outer periphery of the stem part 10*b*. Since the discharge ports 50 and 51 are larger in diameter than the supply ports 48 and 49 respectively, it is possible to effectively discharge the liquid from the annular passages 46 and 47 to the discharge ports 50 and 51 respectively.

As shown in FIG. 2, a first valve drive mechanism 28 is an air cylinder, for actuating the valve plugs 7 and 9. The mechanism includes a fixed cylinder 30 and a piston 29 for reciprocation in the cylinder 30. The piston 29 is fixed to the upper solid stem part 8*a* which acts as the piston rod. The first coil spring 11 is interposed between the piston 29 and the upper stem part 10*a* of the second valve stem 10. The spring 11 urges the first valve stem 8 and the piston 29 upward, and the second valve stem 10 downward. An annular spring bearing 31 is placed at the top of the cylinder 30 around the piston rod 8*a*. A second coil spring 32 and a stopper 33 are interposed between the bearing 31 and the piston 29. The second coil spring 32 has a stranger biasing force than the first coil spring 11. The stopper 33 is affixed to the piston rod 8*a*, and telescopically engages with the bearing 31 to limit the extension of the second coil spring 32 within a certain range. A stroke adjusting ring R is fitted around the rod 8*a* between the stopper 33 and the top wall 30*c* of the cylinder 30. The spring bearing 31 includes an annular body 31*o*, with one end of the second spring 32 bearing against it, and a lower cylindrical part 31*a* formed coaxially and integrally with the annular body 31*o*. The stopper 33 is in a fixed position around the piston rod 8*a*. The stopper 33 includes an upper cylindrical part 33*a* in a limited slidable engagement with the cylindrical bearing part 31*a*. The cylindrical parts 31*a* and 33*a* have end flange 31*b* and 33*b* respectively for mutual engagement to interconnect the bearing 31 and stopper 33. Normally as shown in FIG. 2, the urging force of the second spring 32 forces the flanges 31*b* and 33*b* to engage each other to keep the bearing 31 and stopper 33 apart to the full extent. This limits any further extension of the second spring 32.

The cylinder 30 has ports 34 and 35 for supplying air to and discharge air from the upper chamber 30*a* and the lower chambers 30*b* on both sides of the piston 29.

Figure 3:
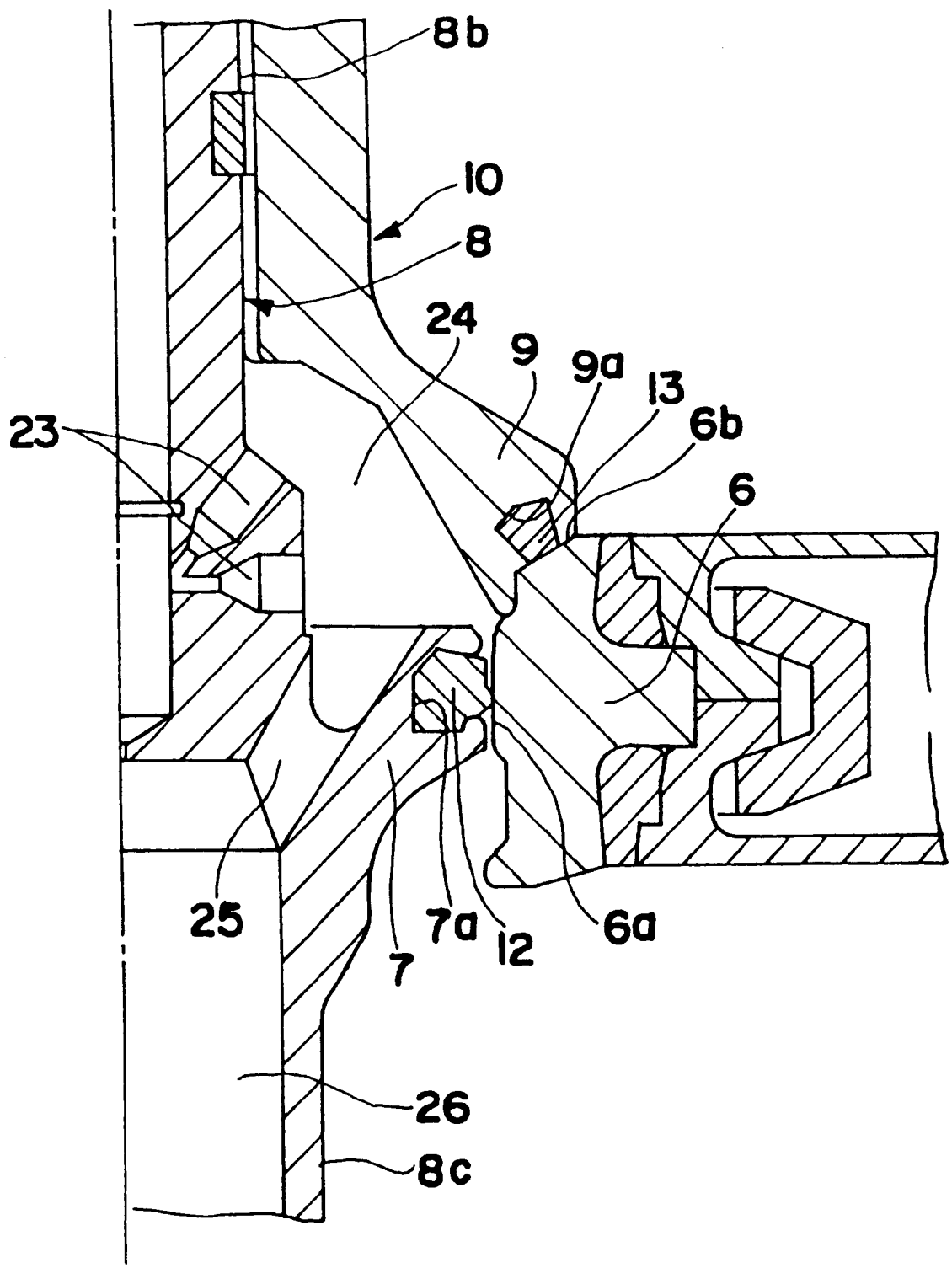
FIG. 3 is an enlarged fragmentary view in axial cross section of the valve when fully closed.
Figure 4:
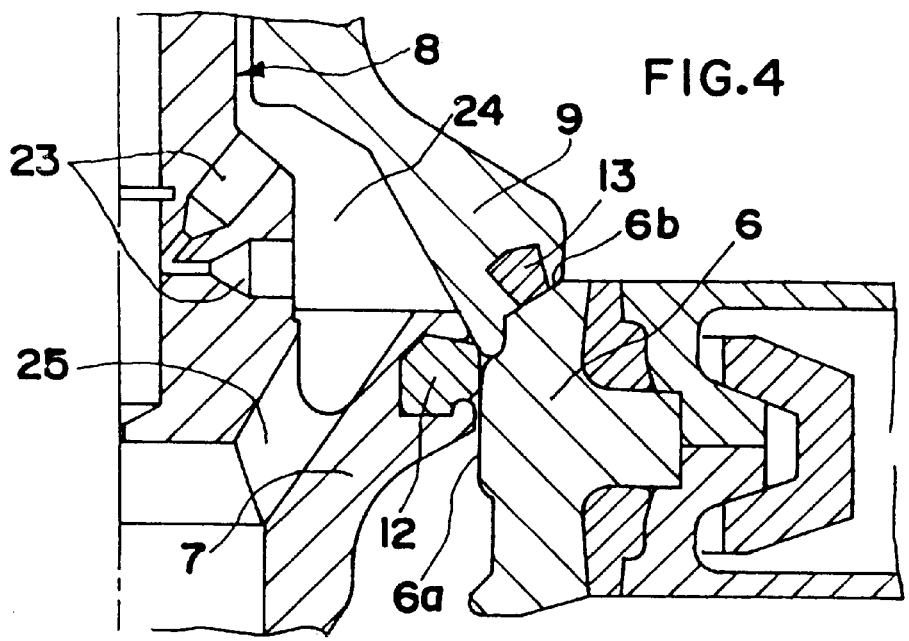
FIG. 4 is an enlarged fragmentary view in axial cross section of the valve as it is changed from the fully closed state to an open state.

As mentioned, the first spring 11 urges the first valve stem 8 upward and the second valve stem 10 downward. When no compressed air is supplied to either of the cylinder chambers 30*a* and 30*b* due to the bias of the second coil spring 32 as shown in FIG. 3 the valve is in the fully closed state in which the first valve plug 7 engages through its primary gasket 12 the inner contact surface 6*a* of the valve seat 6 and the second valve plug 9 engages through its gasket 13 the upper valve seat contact surface 6*b*. When compressed air is supplied through the port 35 to the lower cylinder chamber 30*b* of the cylinder 30, the piston 29 is pushed upward together with the attached first valve stem 8 against the compressive force of the second spring 32. This retracts the cylindrical part 33*a* of the stopper 33 into the cylindrical part 31*a* of the spring bearing 31. As the stem 8 moves upward, as shown in FIG. 4 the top of the first valve plug 7 moves upward and contacts the bottom of the inner periphery of the second valve plug 9. As the stem 8 continues to move up, it lifts the mutually contacting plugs 7 and 9 away from contact with the valve seat 6. When the stroke adjusting ring R contacts the top wall 30c of the cylinder 30, the piston 29 reaches its upper limiting position so that the valve is completely open, as shown in FIG. 5, with both plugs 7 and 9 in their open positions.

When the valve is thus completely open, and if the air in the lower chamber 30b of the cylinder 30 is discharged and the bias of the second spring 32 moves the piston 29 downward while the spring bearing 31 is pressed against the top wall 30c of the cylinder. This lowers the valve stems 8 and 10, so that the valve plugs 7 and 9 return to their fully closed positions shown in FIG. 3. The stroke adjusting ring R adjusts the stroke Sa (FIG. 2) of the piston 29 between the fully closed positions as shown in FIG. 3 in which the valve plugs 7 and 9 are lowered, and the fully open position of FIG. 5 in which both are raised.

If compressed air is supplied through the port 34 to the upper chamber 30a of the cylinder 30 when the valve is fully closed as shown in FIGS. 1 and 2, the pressure increase in the upper cylinder chamber 30a pushes the piston 29 downward together with the first valve stem 8 against the compressive force of the first spring 11, since the stopper 33 limits the extension of the second spring 32. This slides the gasket 12 of the first valve plug 7 downward on the inner surface 6a of the valve seat 6. The piston 29 and stem 8 stop moving down when, as explained below, the piston abuts against the top of a second cylinder 37. In this lower limiting position of the stem 8, the first valve plug 7 was lowered out of contact with the valve seat surface 6a and is slightly open. The second valve plug 9 is still closed, so that the valve is partially open as shown in FIG. 6. It is thus possible to open only the plug 7 by lowering only the stem 8 with compressed air supplied to the upper chamber 30a. The first valve stem 8 can reciprocate with the piston 29 to the extent of the stroke Sb (FIG. 2) independently from the second valve stem 10.

Positioned under the first valve drive mechanism 28 is a second valve drive mechanism 36, which is an air cylinder. This drive 36 includes the second cylinder 37, which is connected to the bottom of the fixed cylinder 30 of the first valve drive mechanism 28. The second valve drive 36 mechanism also includes a second piston 38, which is slidably fitted around the upper stem part 10a for reciprocation within a specified stroke in the second cylinder 37. The second piston 38 is urged into its lower limiting position by a third compression spring 39. The second piston 38 defines a second lower cylinder chamber 37a and a upper cylinder chamber 37b on its both sides in the cylinder 37. The second upper cylinder chamber 37b communicates with the first lower cylinder chamber 30b of the fixed cylinder 30. The second valve drive mechanism 36 has a port 40 for supplying air to and discharging air from the second lower cylinder chamber 37a.

The downward movement of the second piston 38 is limited by a stopper 41, which is formed on the bottom wall of the second cylinder 37. The upward movement of the second piston 38 is limited by a stopper 42, which is formed on the top of the cylinder 37. The piston 38 can reciprocate between the stoppers 41 and 42 by the distance determined by the stroke S1, which is the space between the upper stopper 42 in contact with an outer peripheral part 38a of the piston 38, and its lower position in contact with the lower stopper 41. The upper stem part 10a of the second valve stem 10 has a stopper 43 formed on it above the piston 38.

The stroke S1 is longer than the axial play S2 defined between the stopper 43 and the central part 38b of the piston 38 when the stem 10 and piston 38 are in their lower limiting positions (FIG. 2). The upward movement of the piston 38 by the stroke S1 lifts the stem 10 against the force of the first spring 11 by the difference (S1 minus S2) between the stroke S1 and the axial play S2. It is thus possible to exert the compressive force of the second spring 32 against the stem 10 by defining between the central part 38b of the piston 38, which is urged its lower limiting position by the third compression spring 39, and the stopper 43 on the stem 10, which is urged into its lower limiting position by the second spring 32, the axial play S2 that is shorter than the stroke S1 of the piston 38.

Thus, if compressed air is supplied through the port 40 to the second lower chamber 37a of the second cylinder 37 when the second piston 38 is in its lower limiting position shown in FIG. 2, the second piston 38 starts to move upward. The stem 10 is kept in its lower limiting position, where the second valve plug 9 is closed, until the central part 38b of the piston 38 moved to the extent of the axial play upper peripheral S2 and contacts the stopper 43 on the second valve stem 10. After the piston part 38b contacts the stopper 43, the upward movement of the piston 38 also lifts the stem 10. The second piston 38 continues to move up within the stroke S11 until its upper peripheral part 38a contacts the upper stopper 42. As shown in FIG. 2, the plug 9 is slightly open in the upper limiting position of the stem 10 while the plug 7 is still closed, so that the valve is partially open. If the air in the lower chamber 37a is discharged, the second piston 38 is lowered under the bias of the third compression spring 39 until it contacts the lower stopper 41, while the stem 10 is lowered by the second compression spring 32 until the plug 9 is closed.

The motion of the first valve plug 7 and the primary annular gasket 12 that is fitted to it are next described with reference to FIGS. 9(A)–9(C).

Figure 9A:
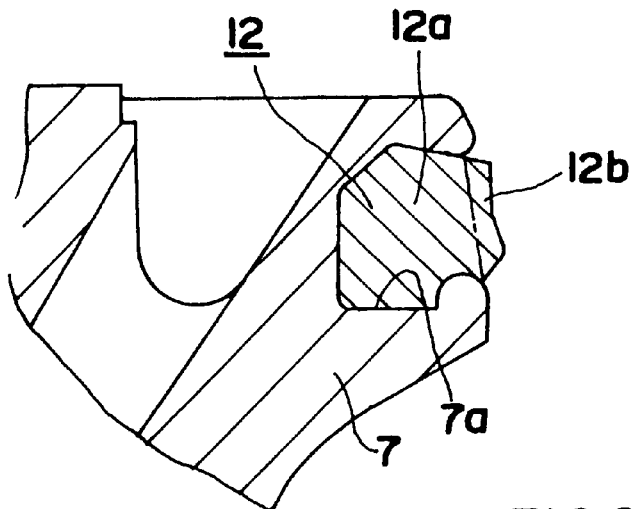
FIG. 9(A) is an enlarged fragmentary view in axial cross section of the valve, showing the primary annular packing member of the first valve plug opened.
Figure 9B:
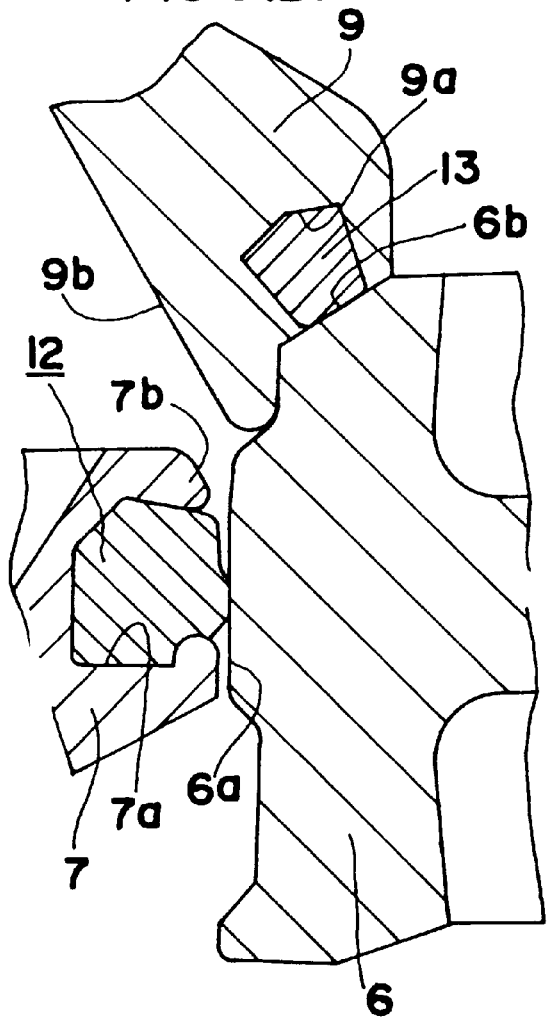
FIG. 9(B) is an enlarged fragmentary view in axial cross section of the valve fully closed, showing the primary annular packing member of the first valve plug closed.

As shown in FIG. 9(A), the primary annular gasket 12 has an inner part 12a which is fitted in the annular groove 7a of the first valve plug 7, and an outer part 12b, which extends outwardly from the annular groove 7a. The radial dimension of the axial cross-sectional area of the inner part 12a is sufficiently suitably from about 8 to about 10 times larger than that of the outer part 12b. FIG. 9(B) shows the valve in the fully closed state, in which the gasket 12 is in compressive engagement with the inner peripheral surface 6a of the valve seat 6 and compressed between the seat 6 and plug 7.

The ratio of the volume of the outer part 12b to the volume of the inner part 12a is proportional to the dilatation of the outer part 12b due to a pressure fluctuation and/or a temperature rise of the liquid flowing through the valve when the valve is open. The larger the volume of the inner part 12a is than that of the outer part, the smaller is the dilatation of the outer part 12b. It is therefore possible to lower the dilatation of the outer part 12b of the primary gasket 12 by making the cross-section of the inner part 12a sufficiently larger than that of the outer part 12b, as referred to above. Consequently, when the open first valve plug 7 as shown in FIG. 5, moves downward and changes to its closed state shown in FIGS. 3 and 9(B), the dilatation of the outer part 12b due to a pressure fluctuation and/or a temperature rise of the liquid flowing through the valve is limited to and as low value as is possible. This maximally reduces the shearing force acting on the outer part 12b when the primary annular gasket 12 engages the inner peripheral surface 6a of the seat 6. As a result, the gasket 12 will not be broken or otherwise damaged.

Figure 9C:
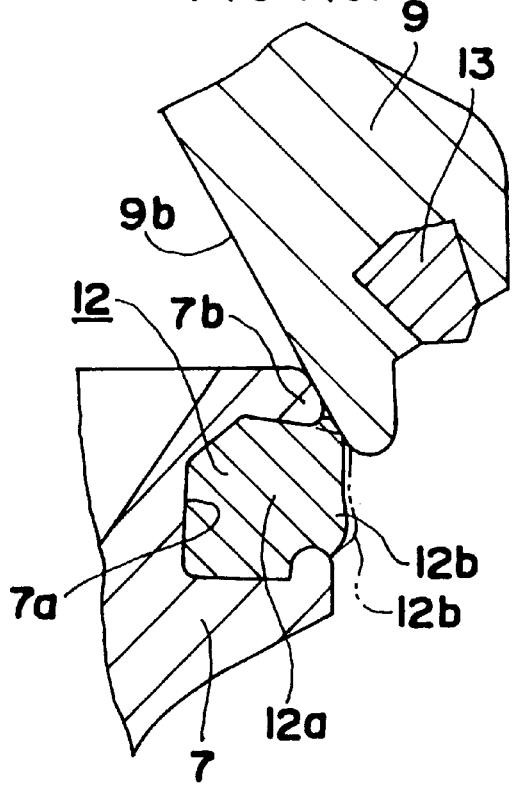
FIG. 9(C) is an enlarged fragmentary view in axial cross section of the closed valve, showing a top edge of the primary annular packing member engaging the inner conical surface of the second valve plug.

FIG. 9(C) shows in cross section the primary annular packing member 12 when the closed first valve plug 7 moves upward, lifting the second valve plug 9, and both plugs 7 and 9 leave the valve seat 6 so that the valve is fully closed as also shown in FIG. 4. The upward movement of the first valve stem 8 brings the top 7b of the plug 7 into contact with a lower part of the inner conical surface 9b of the plug 9, which expands or diverges downwardly. As a result, the top edge of the outer part 12b of the gasket 12 engages the conical surface 9b just below the top 7b after plug 7. Thus, when the valve is fully open as shown in FIG. 5, the top edge of the outer part 12b engages the conical surface 9b, so that the surface 9b partially restrains the outer gasket part 12b. This restrains the outer part 12b from swelling due to a pressure fluctuation and/or a temperature rise of the liquid flowing through the valve. If solid lines as shown in best in FIG. 9(C), the outer part 12b is heated or compressed by the liquid when its top edge is in engagement with the conical surface 9b, the edge deforms upwardly along the surface 9b and becomes less restrained. Therefore, it is possible to prevent the outer part 12b overall from radially swelling and deforming as shown by the broken line in FIG. 9(C).

As mentioned, the inner part 12a of the primary annual gasket 12, which is fitted in the groove 7a, has a sufficiently larger cross section than the outer part 12b. As also mentioned, the top edge of the outer part 12b engages the lower part of the inner conical surface 9b of the second valve plug 9 when the valve is fully open. This reduces the shearing force on the outer part 12b as much as possible, when the first valve plug 7 transfers from its fully open position to closing. Thus it is possible to improve the durability of the gasket 12.

The primary annular gasket 12 of the first valve plug 7 is suitably made of rubber containing a suitable amount of a fluororesin. This can reduce the frictional sliding resistance of the gasket 12 and improve its durability. The inner peripheral surface 6a of the valve seat 6 is suitably covered by a coating or lining layer of a fluororesin to improve the durability of the seat surface 6a.

Figure 12A:
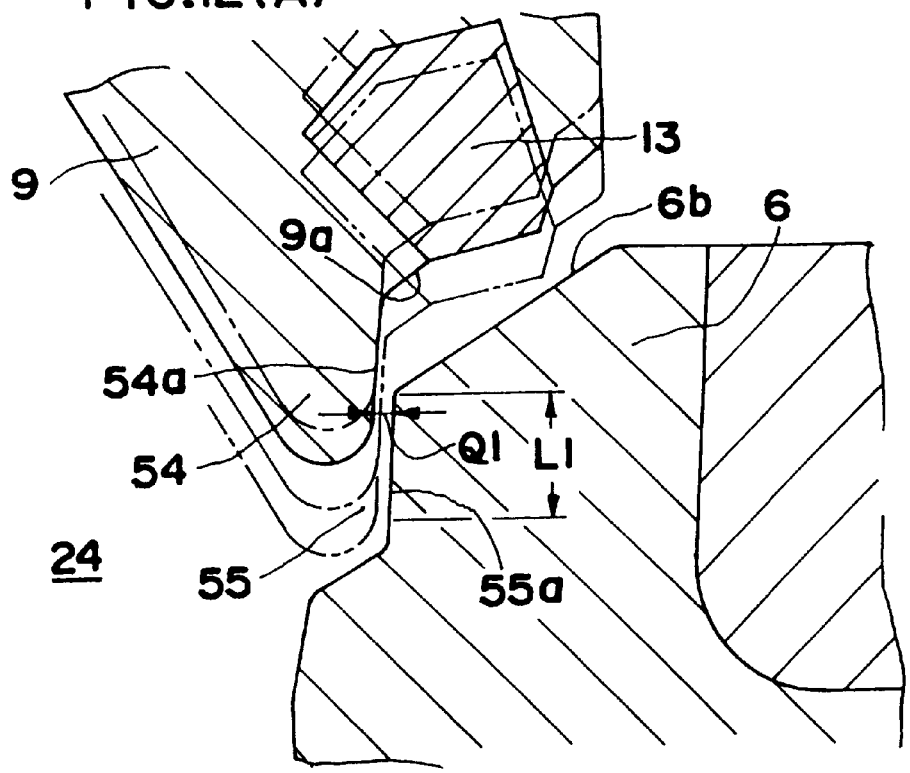
FIG. 12(A) is an enlarged fragmentary view in axial cross section of the valve, showing the clearance between the second valve plug and the valve seat.
Figure 12B:
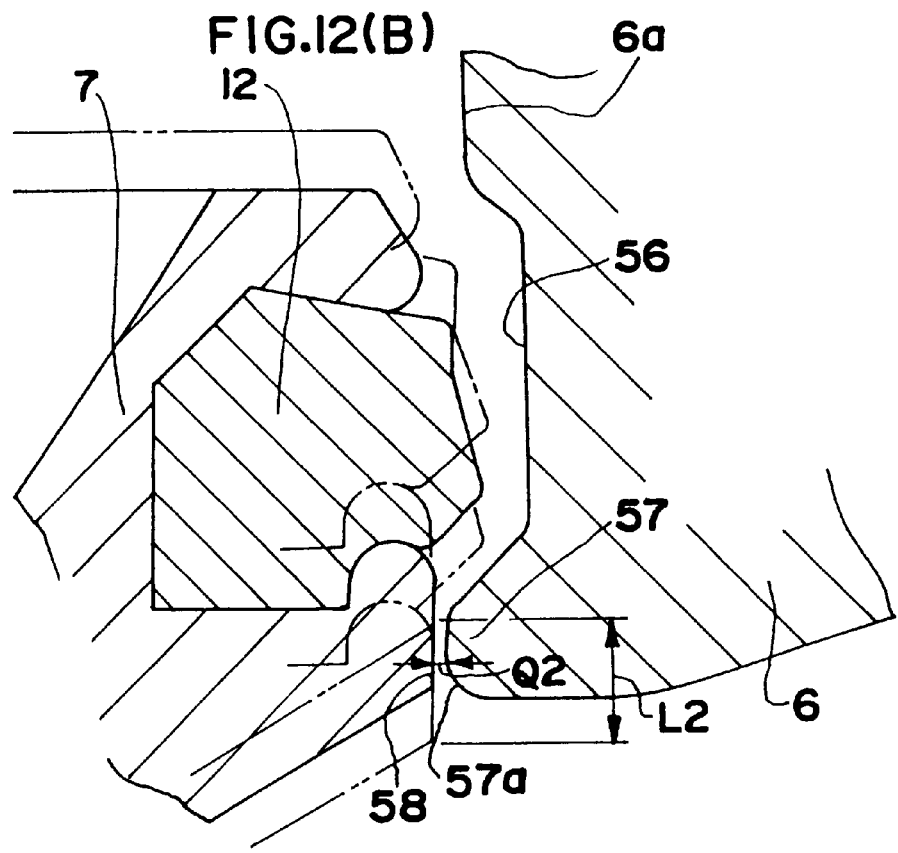
FIG. 12(B) is an enlarged fragmentary view in axial cross section of the valve, showing the clearance between the first valve plug and the valve seat.
Figure 13:
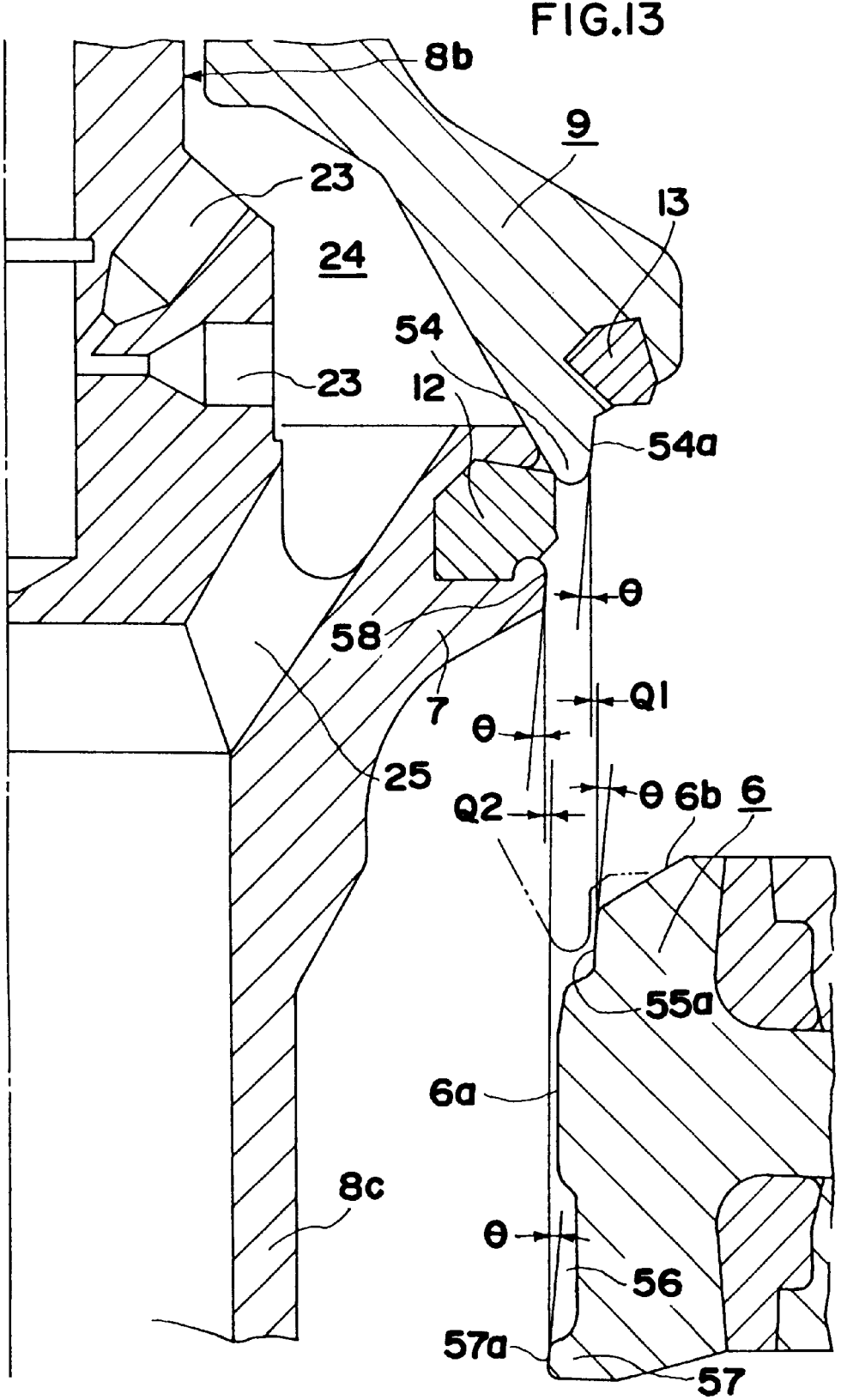
FIG. 13 is an enlarged fragmentary view in axial cross section of the valve, showing the valve plugs and seat having conical surfaces for defining the clearances between them.

Structural features of the valve plugs 7 and 9 and the seat 6 are next disclosed with reference being had to FIGS. 12(A), 12(B) and 13.

When the valve is partially open, as shown in FIG. 12(A), with the second valve plug 9 being slightly open, a slight clearance Q1 is defined between the plug 9 and the valve seat 6 over the required opening stroke L1 of the plug 9. Specifically, the plug 9 has an inclined circumferential surface 9b, which faces the upper conical surface 6b of the valve seat 6. The plug 9 also has an annular bottom 54 extending by a required length below the inclined surface 9b. The seat 6 has an inner annular recess 55 formed below the conical contact surface 6b, which the bottom 54 of the plug 9 can enter. The clearance Q1 is nearly constantly defined between the outer peripheral surface 54a of the plug bottom 54 and the circumferential surface 55a of the seat recess 55, over the opening stroke L1 of the plug 9.

Figure 7:
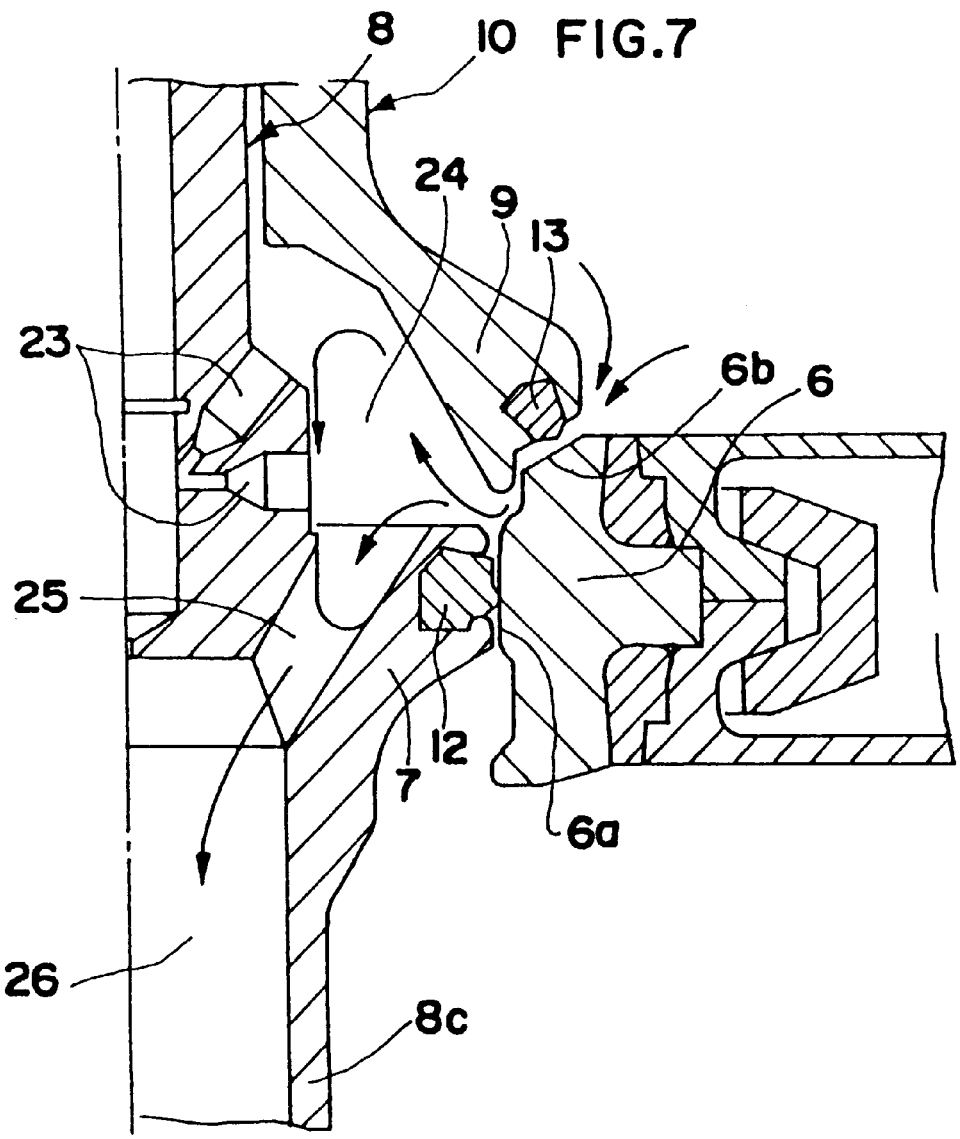
FIG. 7 is an enlarged fragmentary view in axial cross section of the valve partially opened with the second valve plug slightly open and the first valve plug closed.

If, as shown in FIG. 7, the valve is partially open with the first valve plug 7 closed and the second valve plug 9 is slightly open as shown in FIG. 12(A) while, for example, a washing liquid and a beverage are flow respectively through the upper passage 1 and lower passage 2, and if the stroke of the second valve stem 10 is set properly, it is postulated that the plug 9 is positioned as shown by solid lines in FIG. 12(A). Even if a minus error occurs in the stroke of the stem 10, so that the plug 9 is positioned above its proper postulated position, as shown by the simple broken line in FIG. 12(A), or if a plus error occurs in the stroke, so that the plug 9 is positioned below its proper postulated position as shown by the double dash line in FIG. 12a, no pressure is applied to the space in the valve, i.e. the annular space 24, since the clearance Q1 is nearly constant over the stroke L1, as is apparent from FIG. 12(A), so that the amount of the liquid flowing in through the clearance Q1 remains nearly constant.

As shown in FIG. 12(B), a slight clearance Q2 is defined between the first valve plug 7 and the valve seat 6 over the required opening stroke L2 of the plug 7 when the plug 7 is open. Specifically, the seat 6 has a bottom 57 of a smaller inner diameter and an inner annular groove 56 formed between the bottom 57 and peripheral surface 6a. The clearance Q2, which is nearly constant over the stroke L2, is defined between the inner peripheral surface 57a of the bottom 57 and the outer peripheral surface 58 of the bottom of the plug 7.

If the valve is partially open with the second valve plug 9 closed and the first valve plug 7 open slightly as shown in FIGS. 6 and 12(B) while, for example, a washing liquid and a beverage are respectively flowing through the passages 2 and 1, and if the stroke of the first valve stem 8 is adjusted properly, it is postulated assumed that the plug 7 is positioned as shown by solid lines in FIG. 12(B). Even if an error occurs in the stroke of the stem 8, so that the plug 9 is positioned above or below its proper position, as shown by simple broken or by double dash broken lines in FIG. 12(B), no pressure is applied to the annular space 24 in the valve, because the clearance Q2 is nearly constant over the stroke L2, as is apparent from FIG. 12(B), so that the amount of the liquid flowing in through the clearance Q2 remains nearly constant.

If the outer peripheral or circumferential surfaces 54a and 55a respectively of the second valve plug 9 and valve seat 6, which define the clearance Q1, are cylindrically parallel to each other, however, they can contact each other. Therefore, these surfaces should be gently conical. Likewise, the peripheral surfaces 58 and 57a of the first valve plug 7 and the seat 6, which define the clearance Q2 should also be gently conical. FIG. 13 shows the surfaces 54a, 55a, 57a and 58 being conical and diverging upwardly at an angle O suitably about of 101 to the vertical axis.

Thus, even if an error occurs in the stroke of the second valve stem 10 when, for example, a washing liquid and a beverage are respectively flowing through the upper passage 1 and lower passage 2, and the valve is partially open with the first valve plug 7 being closed and the second valve plug 9 slightly open as in FIG. 7 with a slight clearance being defined for washing by allowing a washing liquid to flow from the upper passage 1 into the annular space 24 in the valve, no pressure is applied to the space 24 in the valve, because a slight clearance is defined between the plug 9 and seat 6 over the required opening stroke of the plug 9 when the plug 9 opens, so that the quantity of the liquid flowing in through the clearance is nearly constant. Therefore, no washing liquid is mixed with the beverage, so that the beverage can be kept safe. If the peripheral surfaces of the plug 9 and seat 6 which define the clearance are appropriately conical, they do not contact each other, so that the open condition of the valve can be maintained securely.

The double sealed valve is fully closed, as shown in FIGS. 1–3, with both valve plugs 7 and 9 closed, when no compressed air is applied to the lower chamber 30b of the fixed cylinder 30 of the first valve drive mechanism 28. Specifically, in that condition the plug 7 tightly but slidably engages through its primary annular gasket 12 the inner peripheral surface 6a of the valve seat 6, while the first coil spring 11 urges the second valve stem 10 downward so that the plug 9 compressively engages the upper conical surface 6b of the seat 6 with the secondary annular gasket 13. Consequently, the communicating passage 3 between the upper passage 1 and lower passage 2 is double sealed with the plug 7 adjacent to the lower passage 2 and the plug 9 adjacent to the upper passage 1. Therefore, the liquids respectively flowing through the passages 1 and 2 are prevented from mixing with each other.

If compressed air is supplied to the lower chamber 30b of the fixed cylinder 30, the first valve plug 7 moves upward as shown in FIG. 4, and then lifting the second valve plug 9 by the plugs 7 and 9 continuing to move up together until they are located sufficiently above the valve seat 6, as shown in FIG. 5, so that the valve is fully open. This opens the communicating passage 3, through which the upper passage 1 and lower passage 2 can communicate with each other.

When a highly viscous beverage or another liquid that is difficult to wash out is used, one of the valve plugs 7 and 9 is closed and the other is slightly opened. The liquid is discharged while the gasket of the open valve plug is washed with a washing liquid. For example, compressed air is supplied to the upper chamber 30a of the fixed cylinder 30 when a highly viscous beverage and a washing liquid respectively flow through the upper passage 1 and lower passage 2. The pressure rise in the chamber 30a lowers the piston 29 together with the second spring 32, the extension of which is limited. Consequently, the first valve stem 8 and plug 7 move downward with the primary annular gasket 12 sliding downward on the inner peripheral surface 6a of the valve seat 6. The valve is partially open, as shown in FIG. 6, when the piston 29 reached its bottom position, with the plug 7 being out of contact with the surface 6a to provide a slight opening and the plug 9 still remains closed. As shown by arrows in FIG. 6, a washing liquid flows from the lower passage 2 through the clearance between the plug 7 and seat 6 and into the annular space 24 defined by the plugs 7 and 9, the seat 6 and the middle stem part 8b of the first valve stem 8. The flowing liquid washes the gasket 12, the surfaces of the plug 7 near the gasket 12, and the inside of the space 24. Then, the liquid is discharged through the bore 26 in the lower stem part 8c to the exterior.

When a highly viscous beverage and a washing liquid respectively flow through the lower passage 2 and upper 1, compressed air is supplied to the lower chamber 37a of the second cylinder 37 of the second valve drive mechanism 36 to lift the second piston 38. The piston 38, as it moves upward lifts the second valve stem 10 by the specified stroke (S1–S2). When the piston 38 has reached its top position, the valve is partially open, as shown in FIG. 7 with only the second valve plug 9 being slightly open. As shown by arrows in FIG. 7, a washing liquid flows from the upper passage 1, between the plug 9 and the upper conical surface 6b of the valve seat into and circulates in the annular space 24. As a result, the liquid washes the secondary annular gasket 13, the surfaces of the plug 9 near the gasket 13, and the interior of the space 24. Thereafter, the liquid is discharged through the bore 26 in the lower stem part 8c of the first valve stem 8 to the exterior.

Since only one piston 29 is provided in the fixed cylinder 30, and it is attached to the piston rod, the first valve drive mechanism 28 needs only one air-tight seal. Therefore, the mechanism has a simple structure and is easy to manufacture. Furthermore, the valve operation cannot be erroneous, because the operation of the piston 29 cannot be out of order.

As mentioned, the second valve drive mechanism 36 is located under the first valve drive mechanism 28. If compressed air is supplied to the lower chamber 37a of the second cylinder 37 when the second piston 38 is in its lower limit position, the upward movement of the piston 38 lifts the second valve stem 10, so that the valve is partially opened with only the second valve plug 9, being open. If the air compressed, is discharged from the chamber 37a, the third spring 39 lowers the piston 38, so that the first spring 11 lowers the stem 10 to close the plug 9. The cylinder 37 is formed under the fixed cylinder 30 to communicate with the cylinder 30, without interposing a partition as was the case in the prior art valves. Therefore, the valve of the present invention can be of a simple and compact structure, and accordingly easy to make at lower cost.

I claim:

1. A double sealed valve comprising
   (i) a first fluid passage,
   (ii) a second fluid passage,
   (iii) a communicating passage between said first and second fluid passages,
   (iv) an annular valve seat in said communicating passage, said valve seat having an upper contact surface, and an inner peripheral contact surface,
   (v) a first valve stem,
   (vi) a hollow second valve stem coaxially slidably disposed outside of said first valve stem,
   (vii) a spring urging said second valve stem toward said valve seat,
   (viii) a first circular valve plug having an annular groove therein,
   (ix) an annular primary gasket disposed within said annular groove for slidable sealing engagement with said inner peripheral surface of said valve seat, said gasket having an inner part disposed within said groove, and an outer part having a top edge and having in axial cross-section a radially smaller size than that of said inner part, said outer part protruding outwardly from said groove,
   (x) a second circular valve plug attached to said second valve stem and having an inner conical surface that diverges outwardly in a direction away from said second valve stem,
   (xi) an annular secondary gasket for compressive sealing engagement with said upper contact surface of said valve seat, and
   (xii) a valve drive mechanism connected from said first valve stem, wherein as the double sealed valve opens the movement of said first valve stem and said first valve plug in a direction away from said valve seat moves said second valve stem and said second valve plug in the same direction, and wherein the top edge of said outer part engages said inner conical surface of the second valve plug as the valve opens, for restraining said outer part from becoming unduly expanded by pressure fluctuation and/or by temperature changes in a fluid as the valve opens.

2. The double sealed valve of claim 1, wherein said annular primary gasket is made of a blend of rubber and a fluororesin.

3. The double sealed valve of claim 1, wherein said inner peripheral surface of said valve seat is coated with a fluororesin.

4. A double sealed valve, comprising
   (i) a first fluid passage, (ii) a second fluid passage, (iii) a communicating passage between said first and second fluid passages, (iv) an annular valve seat in said communicating passage, said valve seat having an upper contact surface, and an inner peripheral contact surface, (v) a first vertical valve stem, (vi) a hollow vertical second valve stem coaxially slidably disposed about said first valve stem, (vii) a first spring downwardly urging said second valve stem, (viii) a first circular valve plug attached to the lower end of said second valve stem for slidable engagement with said inner peripheral contact surface, (ix) a second circular valve plug attached to said second valve stem, (x) a valve drive mechanism connected from said first valve stem, and having (a) a fixed vertical cylinder having a lower part, (b) said cylinder having two ports for inlet and output of compressed air, (c) a piston for reciprocation within said cylinder, the piston being attached from said first valve stem which acts as a piston rod, in said cylinder there further being disposed (d) an upper piston chamber, and a (e) lower piston chamber, said ports each being connected to a respective one of said upper and lower chambers, said first spring being disposed between said piston and said second valve stem, (f) a bearing plate disposed at the top of said cylinder for said first spring, (g) a second spring disposed between said bearing plate and said piston, and having a greater biasing force than said first spring, and (h) a stopper disposed between said bearing plate and said piston, and being attached to said first valve stem, and being connected in a vertically telescoping relationship with said bearing plate for limiting the extension of said second spring to a predetermined distance, and (xi) a valve stem drive mechanism disposed below said valve drive mechanism, said valve stem drive mechanism comprising (a) a second vertical cylinder disposed below and attached to the lower part of said fixed vertical cylinder, (b) a second top chamber over said second vertical cylinder, said top chamber being in fluid communication with said lower piston chamber, (c) a second piston within said second vertical cylinder, said second piston being coaxially slidably disposed about said second valve stem for vertical reciprocation within said second cylinder by a predetermined stroke, (d) a third spring urging said second piston into a lower piston travel limiting position, (e) a second lower piston chamber defined below said second piston, (f) a lower port for supplying compressed air to and discharging air from said second lower piston chamber, and when compressed air is conducted through said lower port into said second lower piston chamber said second piston moves upward, said piston lifting said second stem against the bias of said first spring and opens said second valve plug wherein the double sealed valve opens as said valve drive mechanism upwardly moves said first valve stem, said first valve plug, and said second valve plug.

5. The double sealed valve of claim 4, said second piston having a central part, said second vertical valve stem having an upper part and a second stopper attached at said upper part and disposed above said second piston, when said third spring moves said second piston into its lower piston travel limiting position, and said second valve stem closes said second valve plug due to the bias of said first spring, said central part and said second stopper are vertically spaced from one another by a predetermined vertical play distance that is shorter than said predetermined stroke of said second piston, whereby the stroke of said second valve stem is the difference between the lengths of said stroke and said play distance.

6. A double sealed valve comprising (i) a first passage for a useful liquid, (ii) a second passage for a washing liquid, (iii) a communicating passage between said first and second passages, (iv) an annular valve seat in said communicating passage, said valve seat having an upper contact surface, and an inner peripheral contact surface, (v) a first vertical valve stem for vertical movable to the extent of a predetermined first maximum stroke, (vi) a valve drive mechanism connected from said first vertical valve stem for raising and lowering said valve stem, (vi) a second vertical valve stem coaxially slidably disposed about said first vertical valve stem for movement thereabout to the extent of a predetermined second maximum stroke, (vii) a first valve plug attached to the lower vertical end of said first valve stem, for slidable engagement with said inner peripheral contact surface of said valve seat, said first valve plug being liftable by said first valve stem out from said engagement as the first valve stem and the first valve plug are being lifted by said valve drive mechanism, (viii) a second valve plug attached to said second valve stem for compressive engagement with said upper surface of said valve seat, and (ix) an upper annular member disposed coaxially about said second valve stem for guiding an upper part of said second stem above said first and second passages, an upper annular passage between the opposed interior surface of said upper annular member and said second valve stem, said upper annular passage being longer than the maximum second stroke of said second valve stem, (x) a lower annular member about a lower part of said first valve stem for slidably guiding said first valve stem therein below said first and second passages, a lower annular passage between the opposed interior surface of said lower annular member and said first valve stem, said lower annular passage being longer than the maximum first stroke of said first valve stem, said upper and lower annular passages further comprising a supply port at their respective lower ends for supplying washing liquid to each of said annular passages, and each of said annular passages, and a respective discharge port at their respective upper ends for the discharge of the washing liquid entering through said supply port, the openings of said discharge ports being larger than the openings of said supply ports.

7. The double sealed valve of claim 6, further comprising a flow pattern distributing ring each disposed within a respective first and second passage, each of said flow pattern distributing rings having a plurality of spiral grooves formed in their respective outer surfaces for inducing a spiral flow pattern is the washing liquid in an associated annular passage.

* * * * *